United States Patent [19]
Van Kuringen

[11] Patent Number: 5,933,583
[45] Date of Patent: Aug. 3, 1999

[54] COMMUNICATION CONTROL APPARATUS FOR A PRINTING SYSTEM

[75] Inventor: Hendricus Maria Johannes Cornelis Van Kuringen, Venlo, Netherlands

[73] Assignee: Océ-Nederland B.V., Ma Venlo, Netherlands

[21] Appl. No.: 08/648,666

[22] Filed: May 16, 1996

[30] Foreign Application Priority Data

May 16, 1995 [EP] European Pat. Off. ............. 95201278

[51] Int. Cl.⁶ .................................................. G06F 15/00
[52] U.S. Cl. ............................................................. 395/114
[58] Field of Search ................................. 395/101, 104, 395/106, 109, 112, 113, 114, 200.3, 200.31, 200.32, 200.43, 200.47, 200.55, 200.57, 200.68, 187.01, 750.01; 358/400, 401, 403, 407, 409, 437, 443, 468

[56] References Cited

U.S. PATENT DOCUMENTS

| | | | |
|---|---|---|---|
| 4,754,428 | 6/1988 | Schultz et al. | 395/200.76 |
| 5,200,830 | 4/1993 | Imaizumi et al. | 358/296 |
| 5,577,172 | 11/1996 | Vatland et al. | 395/114 |
| 5,699,493 | 12/1997 | Davidson, Jr. et al. | 395/114 |

FOREIGN PATENT DOCUMENTS

| | | |
|---|---|---|
| 509524A2 | 10/1992 | European Pat. Off. . |
| 509528A2 | 10/1992 | European Pat. Off. . |
| 513549A2 | 11/1992 | European Pat. Off. . |
| 598511A2 | 5/1994 | European Pat. Off. . |
| 2-237356 | 3/1989 | Japan . |

OTHER PUBLICATIONS

Xerox Disclosure Journal, vol. 13, No. 5, Sep. 1988, Stamford, Conn US, pp. 279–280, B.C. Barlow and D.J. Smereski 'Low Cost Printer Sharing Mechanism–Dnet.

*Primary Examiner*—David K. Moore
*Assistant Examiner*—Gabriel I. Garcia

[57] ABSTRACT

A communication controller for protecting data, stored in a printer or other printing device connectable to a first network, from unauthorized access including: an external communication device for communicating with an external station through a second network; an internal communication device for receiving operation related data relating to the operation of the printer; and a controller for allowing the external communication device to communicate the operation related data to the external station only when the printing apparatus is functionally disconnected from the first network. A sensor is also provided to sense whether the printer is off or otherwise functionally disconnected from the first network. A switch permits real-time testing of the printer while it is connected to the first network. This switch automatically resets when not pushed to prevent accidental external access to the printer while it is connected to the first network.

36 Claims, 2 Drawing Sheets

5,933,583

COMMUNICATION CONTROL APPARATUS FOR A PRINTING SYSTEM

BACKGROUND OF THE INVENTION

1. Technical Field of the Invention

This invention relates to a communication control apparatus that controls communication between equipment which is selectively connectable to a first network and an external station wherein the external station is connected to the equipment through a second network. The equipment is preferably a printing apparatus which is used in conjunction with the communication control apparatus in a printing system to increase data security and prevent unauthorized access to data through the printer.

2. Description of Related Art

In conventional systems, it is known to perform a so-called remote maintenance of a copying apparatus. In these systems, an external service station calls up the copying apparatus via a modem that is installed with the copier and collects operation related data directly from the copier. Such operation related data may include, for example, the number of copies made since the last service, status of different parts, jam occurrence, toner replenishment etc. In this way, it is possible for the service station to provide accurate servicing of the copying apparatus in a timely manner and also enables the service station to check and track the frequency of equipment errors.

With reference to FIG. 1, a conventional infrastructure commonly used in modern offices will be explained. Printer 2 is connected to an internal network 1. The internal network 1 typically supplies the printer 2 with printer data from individual work stations. To service the printer 2, the service station 5 (normally an external firm) needs to receive access to status data from the printer 2 via a public telephone line 4. For this purpose, a conventional communication control apparatus 3 including a standard telephone modem is connected to the printer 2. In this way, the external service station 5 may call up the printer 2 via the public telephone line 4 and read out the status data automatically.

A data security problem is created by this conventional infrastructure. The source of this problem is that not only may the authorized external service station 5 call the printer 2 via the telephone line 4, but also an unauthorized person may access the printer 2 in this way. In other words, the printer 2 can serve as a back door which can be opened by unauthorized persons to access confidential data. This results in the customer being anxious that an unauthorized person could get access, via the printer 2, to confidential data on the internal network 1. Thus, the customer may refuse to allow the service station to install such modem because of the data security risk that such an installation presents.

Another example of such remote maintenance is disclosed in document EP-A-0 509 528. This document discloses a communication control apparatus connected to a copier in order to control the communication with the remote host computer. In order to not disturb an ongoing copy operation, the communication is controlled so that a data transfer via modem can only take place when the copier is not copying a document. This remote maintenance system is also susceptible to infiltration by an unauthorized person and poses a data security risk as discussed above.

To address this data security risk, two main solutions have been proposed in the prior art: the provision of a password access control as disclosed in document EP-A-0 513 549 and a call-back technique as disclosed in JP-A-02 237356.

The call-back technique has disadvantages. The call-back technique involves the service station calling-up the copier and the copier then calling-back the service station from a list of authorized, internally stored phone numbers. If the service station relocates or otherwise changes phone numbers, then the internal authorized phone number list must be updated. The customer may also experience increased phone bills due to this call-back procedure--especially if the service station phone number is long distance.

Because a password can be compromised or cracked, password protection for external access is not sufficient to ensure data security. Furthermore, passwords are inconvenient because they must be memorized and their confidentiality protected by such measures as long, complex passwords and frequent changing of the password. If the password is forgotten, the external service station will experience further difficulties.

The proliferation of unscrupulous hackers and industrial espionage heightens the above-described data security risk. Thus, there is a need for a reliable data security measure in this field.

SUMMARY AND OBJECTS OF THE INVENTION

It is an object of the present invention to provide a reliable data security measure for printing systems. This object is achieved by providing a communication control apparatus including an internal communication device for communicating with a printer apparatus that is connectable to a first network, an external communication device for communicating with an external station through a second network and a controller for allowing the external communication device to communicate with the external station only when the printer apparatus is not functionally connected to the first network.

Another object of the present invention to provide a printing system with improved data security. This object is achieved by providing a printing system that includes a printing apparatus connectable to a first network for receiving print data therethrough and a communication control apparatus connected to the printing apparatus. To further achieve this object, the communication control apparatus includes an external communication device for communicating with an external station through a second network and an internal communication device for communicating with the printing apparatus, wherein the communication control apparatus allows the external communication device to communicate with the external station only when the printing apparatus is not functionally connected to the first network.

Another object of the present invention is to allow real-time testing of the printer while it is connected to the first network and still ensure data security. This object is accomplished in a second preferred embodiment of the present invention wherein the communication control apparatus includes: an operator operable switch for outputting a signal indicating whether a priority status has been switched on and a controller connected to the switch, said controller allowing communication with the external station when the priority status has been switched on or, in the case that the priority status is switched off, only when the printing apparatus is not functionally connected to the first network.

In the preferred embodiment, external communication is only allowed when the printing apparatus is shut off or otherwise functionally disconnected from the first network.

The second embodiment has the advantage of permitting an online diagnostic of the printer.

It is a further object of the present invention to provide a printer communication control apparatus for use in a printing system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
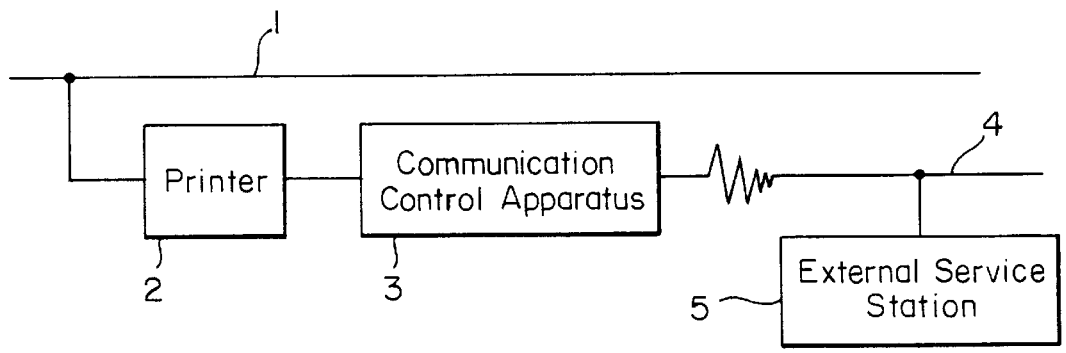
FIG. 1 is a schematic diagram showing a conventional infrastructure.
Figure 2:
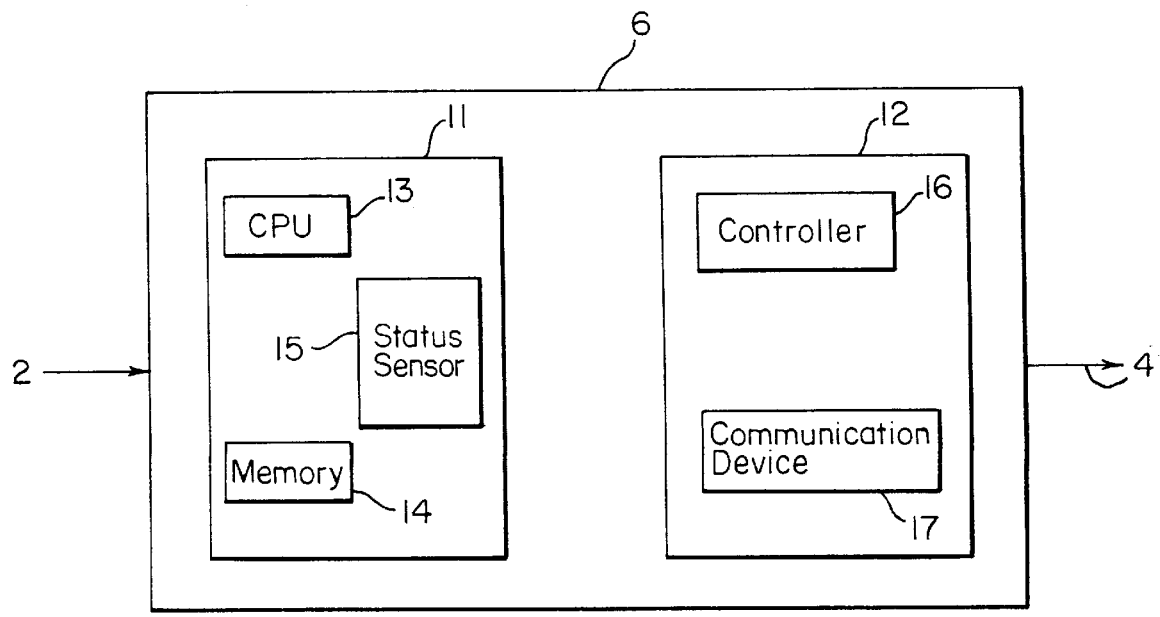
FIG. 2 is a schematic structural diagram showing a communication control apparatus according to the present invention.

A schematic diagram of a communication control apparatus 6 in accordance with the invention is shown in FIG. 2. The inventive communication control apparatus can be used, for example, in place of the conventional communication control apparatus 3 shown in FIG. 1.

The communication control apparatus 6 includes two parts: the internal part 11 communicates with the printer 2 via network 1 and the external part 12 communicates with the external service station 5 via the second network 4. When the printer 2 is switched on, the central processing unit (CPU) 13 of the internal part 11 of the communication control apparatus 6 automatically reads operation related data from the printer 2 at regular intervals. Such operation related data may include the number of prints made since last service, need for toner replenishment, status of the printer parts, error messages, jam occurrences, etc. This data may also include market analysis data such as the most frequently used job structures.

The data read by the CPU 13 are then stored in a memory 14 such as a RAM. The data read out are updated at regular time intervals such as every hour to provide the service station 5 with the latest data upon request.

The internal part 11 further includes a status sensor 15 for sensing a status of the printer 2. The status sensor 15 senses whether the printer 2 is connected or disconnected to the internal network 1. In a preferred embodiment, the status sensor 15 senses whether the printer 2 is shut on or off.

In another embodiment, the communication control apparatus 6 is automatically activated to allow external communication only when the printer 2 is shut off. If the printer 2 is shut off, then the printer 2 is, of course, disconnected from the internal network 1. This embodiment is convenient because the operator merely has to switch the printer off in the evening to permit the external service station 5 to call the communication control apparatus 6 during non-business hours to make a communication request that, if granted, permits the external service station 5 to retrieve the data relating to the printer 2.

Figure 4:
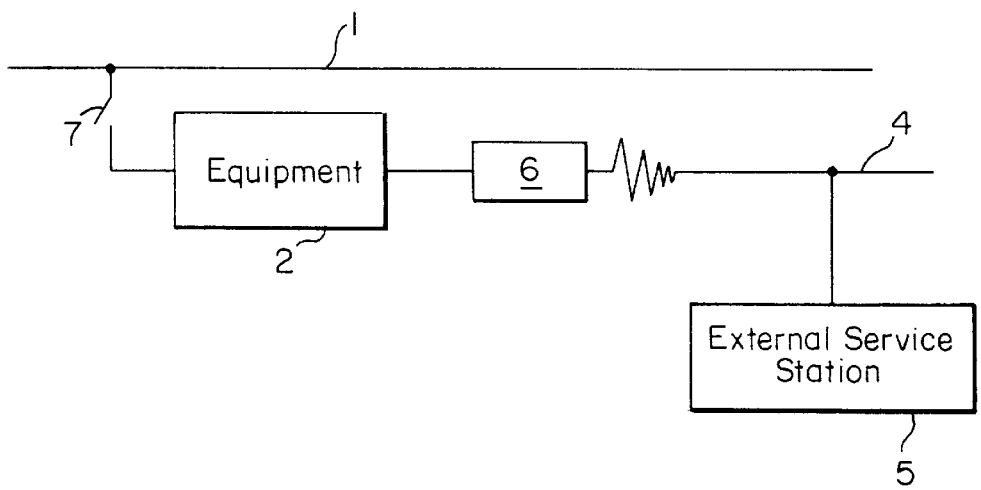
FIG. 4 is a schematic diagram showing an embodiment of the inventive infrastructure.

Of course, other solutions are possible. The operator may actively disconnect the printer 2 from the internal network 1 by pulling the plug. Alternatively, a switch 7 may be provided for functionally connecting/disconnecting the printer 2 from the internal network 1 as shown in FIG. 4. The status sensor 15 would then sense whether the connection has been functionally broken by the switch 7. Instead of using a status sensor 15, activation of the switch 7 could automatically activate the communication control apparatus 6 to allow external communication with the printer 2.

The external part 12 of the communication control apparatus 6 includes a communication device 17 such as a telephone modem to manage the telephone connection and a controller 16 for deciding whether a connection is allowed or not. The controller 16 will allow an external communication if and only if the status sensor 15 senses that the printer 2 is functionally disconnected from the internal network 1. Thus, the customer can be assured that there is no possibility of data leaking from the internal network 1 through the printer 2 and the communication control apparatus 6 to an unauthorized person.

To further ensure data security, the only data that can be read out from the communication control apparatus 6 are the operation related data stored in the memory 14. Because external communication is only allowed when the printer 2 is shut down or otherwise functionally disconnected from the internal network 1, there is no possibility of gaining access to the internal network 1 via the communication control apparatus 6.

Normally, the external service station 5 automatically calls the printer 2 every night to get the stored operation related data. If, however, a request for data from the external service station 5 has not been received within a predetermined time, the communication control apparatus 6 can store the operation data relating to this predetermined time in memory 14. For example, the operation data for a whole week can be stored and transmitted to the external service station 5 upon request. Instead of using memory 14, a separate memory may be used for this purpose. Also, a plurality of such memories, or equivalently distinct portions of the same memory, may be provided so that accumulated, nontransmitted operation data may be stored in the case that no data request has been received.

Figure 3:
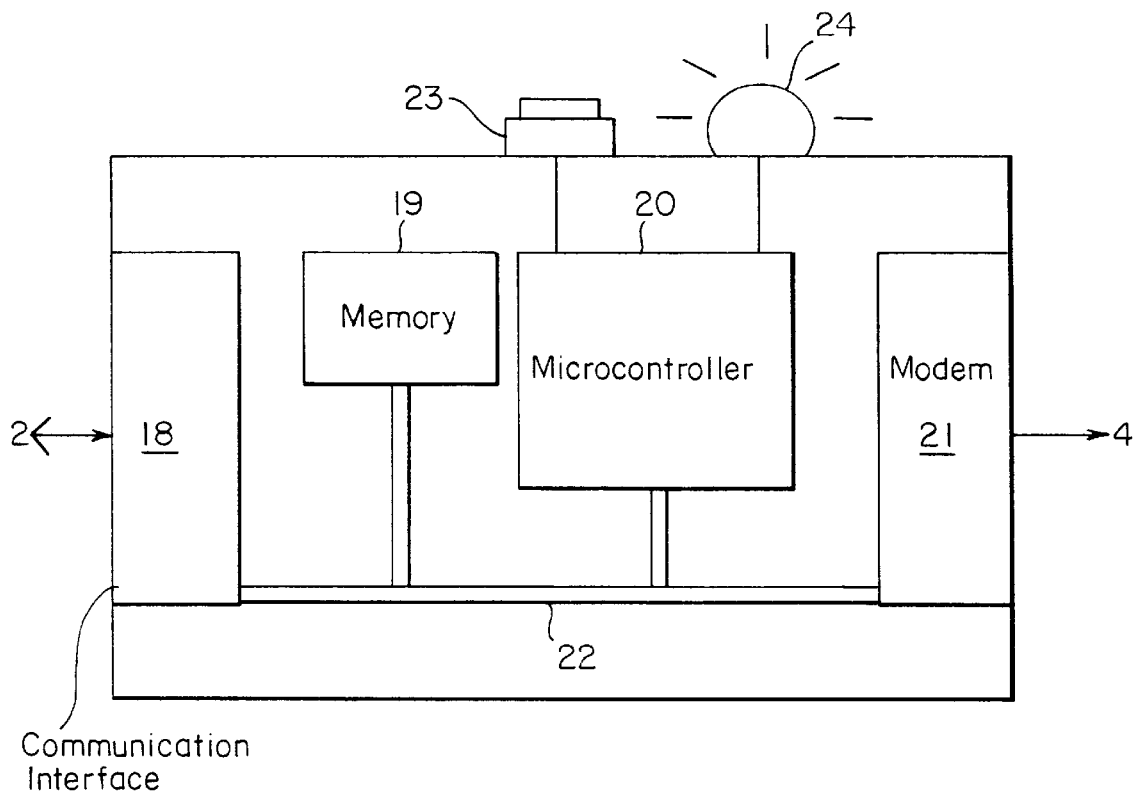
FIG. 3 is an example of a communication control apparatus according to a preferred embodiment.

FIG. 3 shows an example of a communication control apparatus 6 according to a preferred embodiment. The apparatus includes a telephone modem 21 which is utilized for the external communication. The modem 21 is controlled by a microcontroller 20 connected to the modem over a bus structure 22. The microcontroller 20 performs the tasks of the controller 16 described above. The microcontroller 20 also controls the internal communication with the printer 2 via a standard communication interface 18. A memory 19, which may include a plurality of separate memories as described above, is provided to store the data read out from the printer 2 and other needed data.

If a problem occurs with the printer 2, the operator can call the service station 5. To diagnose this problem, the service station 5 may want to get status data from the printer 2 in real time, eg while it is printing. In this case, the communication control apparatus 6 is equipped with an operator operable switch such as the button 23.

When the button 23 is manually pressed by the operator, it enables the service station 5 to get data via the telephone line 4 even if the printer 2 is switched on, eg. functionally connected to the internal network 1. To indicate that external access is being granted while the printer is connected to the internal network 1, a signaling device, such as lamp 24, is preferably included. When this telephone communication has ended, the button 23 is preferably automatically reset in a non-communicating state. Thus, the customer will not be anxious that data security is compromised because the operator forgot to reset the button 23.

The above description is only one example of an embodiment of the invention. It will be clear to the skilled person that a number of other embodiments are possible within the scope of the claims. For example, the printing apparatus 2 is not limited to a printer, but may also be a plotter or a copying apparatus having a print option or any other equipment which can be connected to a network.

Although the preferred embodiment is directed to printing system, it is also possible to use the communication control apparatus independently of a printer. Such a communication control apparatus comprises: an internal communication device for communicating with equipment connectable to a first network; an external communication device for communicating with an external station through a second network and a controller for allowing the external communication device to communicate with the external station only when the equipment is not functionally connected to the first network.

It should be noted that the first network 1 is not necessarily an internal network in the sense of an in-house network, but may be any kind of network through which data is provided to the equipment 2.

Furthermore, the invention is not limited to hard-wired communication. Instead of using a modem, the second network 4 may use wireless communication such as, for example, radio frequency (RF), microwave, or infrared communication.

Although the service station 5 has been described as an external service station, it is to be understood that the service station 5 may be internal such as a service department in a large corporation. In this case, the corporation may want to prevent the internal service department from gaining access to data on the first network 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A printing system, comprising:
    a first network;
    printing means for receiving print data and reproducing the received print data, said printing means capable of being functionally connected to and functionally disconnected from said first network and receiving the print data while functionally connected to said first network;
    external communication means for communicating with an external station through a second network;
    internal communication means receiving operation related data from said printing means, the operation related data relating to an operation of said printing means; and
    control means for allowing said external communication means to communicate the operation related data to the external station only when said printing means is functionally disconnected from said first network,
    wherein said control means is automatically activated to allow said external communication means to communicate with the external station when said printing means is switched off.

2. The printing system of claim 1, further comprising:
    sensing means for sensing whether said printing means is functionally connected to or disconnected from said first network,
    wherein said control means allows said external communication means to communicate with the external station only when said sensing means senses that said printing means is functionally disconnected from said first network.

3. The printing system of claim 1, wherein said control means is automatically activated to allow said external communication means to communicate with the external station when said printing means is functionally disconnected from said first network.

4. The printing system of claim 1, said internal communication means further including:
    read-out means for reading the operation related data from said printing means; and
    storage means for storing the operation related data read-out by said read-out means,
    wherein said control means permits said external communication means to communicate the stored operation related data to the external station via the second network only when said printing means is functionally disconnected from the first network.

5. The printing system of claim 4, wherein said read-out means reads the operation related data and said storage means stores the operation related data read-out by said read-out means automatically at predetermined times.

6. The printing system of claims 4, further comprising means for determining whether a data request has been received from the external station within a predetermined time.

7. The printing system of claim 1, wherein said printing means includes a printer, a plotter, or a copying machine having a printer option.

8. A printing system, comprising:
    a first network;
    printing means for receiving print data and reproducing the received print data, said printing means capable of being functionally connected to and functionally disconnected from said first network and receiving the print data while functionally connected to said first network;
    external communication means for communicating with an external station through a second network;
    internal communication means receiving operation related data from said printing means, the operation related data relating to an operation of said printing means;
    control means for allowing said external communication means to communicate the operation related data to the external station only when said printing means is functionally disconnected from said first network; and
    sensing means for sensing whether said printing means is switched on or off,
    herein said control means allows said external communication means to communicate with the external station only when said sensing means senses that said printing means is switched off.

9. A printing system, comprising:

a first network;

printing means for receiving print data and reproducing the received print data, said printing means capable of being functionally connected to and functionally disconnected from said first network and receiving the print data while functionally connected to said first network;

external communication means for communicating with an external station through a second network;

internal communication means receiving operation related data from said printing means, the operation related data relating to an operation of said printing means;

said internal communication means further including:
 read-out means for reading the operation related data from said printing means; and
 storage means for storing the operation related data read-out by said read-out means, means for determining whether a data request has been received from the external station within a predetermined time;
 second storage means for storing the operation related data which has not been transmitted to the external station within the predetermined time, and
 control means for allowing said external communication means to communicate the stored operation related data to the external station via the second network only when said printing means is functionally disconnected from said first network.

10. A printing system, comprising:

a first network printing means for receiving print data and reproducing the received print data, said printing means capable of being functionally connected to and functionally disconnected from said first network and receiving the print data while functionally connected to said first network;

external communication means for communicating with an external station through a second network;

internal communication means receiving operation related data from said printing means, the operation related data relating to an operation of said printing means;

sensing means for sensing whether said printing means is switched on or off, control means for allowing said external communication means to communicate the operation related data to the external station; and switch means for enabling selection of a priority status and for outputting a signal to said control means indicating whether a priority status has been switched on or off, wherein said control means allows said external communication means to communicate with the external station when the signal indicates that priority status has been switched on or, in the case that the signal indicates that the priority status has been switched off, only when said sensing means senses that said printing means is switched off.

11. The printing system of claim 10, further comprising:

sensing means for sensing whether said printing means is functionally connected to or disconnected from said first network, wherein said control means allows said external communication means to communicate with the external station when the signal indicates that priority status has been switched on or, in the case that the signal indicates that the priority status has been switched off, only when said sensing means senses that said printing means is functionally disconnected from said first network.

12. The printing system of claim 10, wherein said control means is automatically activated to allow said external communication means to communicate with the external station when said printing means is functionally disconnected from said first network.

13. The printing system of claim 10, said internal communication means further including:

read-out means for reading the operation related data from said printing means; and storage means for storing the operation related data read-out by said readout means, wherein said control means allows said external communication means to communicate with the external station when the signal indicates that priority status has been switched on or, in the case that the signal indicates that the priority status has been switched off, only when said printing means is functionally disconnected from the first network.

14. The printing system of claim 13, wherein said read-out means reads the operation related data and said storage means stores the operation related data read-out by said read-out means automatically at predetermined times.

15. The printing system of claims 13, further comprising means for determining whether a data request has been received from the external station within a predetermined time.

16. The printing system of claim 10, said switch means further including indicating means for indicating to the operator that external communication is allowed while said printing means is functionally connected to said first network.

17. The printing system of claim 10, wherein said printing means includes a printer, a plotter, or a copying machine having a printer option.

18. A printing system, comprising:

a first network;

printing means for receiving print data and reproducing the received print data, said printing means capable of being functionally connected to and functionally disconnected from said first network and receiving the print data while functionally connected to said first network;

external communication means for communicating with an external station through a second network;

internal communication means receiving operation related data from said printing means, the operation related data relating to an operation of said printing means;

control means for allowing said external communication means to communicate the operation related data to the external station; and switch means for enabling selection of a priority status and for outputting a signal to said control means indicating whether a priority status has been switched on or off, wherein said control means allows said external communication means to communicate with the external station when the signal indicates that priority status has been switched on or, in the case that the signal indicates that the priority status has been switched off, only when said printing means is functionally disconnected from said first network, wherein said control means is automatically activated to allow said external communication means to communicate with the external station when said printing means is switched off.

19. A printing system, comprising:

a first network, printing means for receiving print data and reproducing the received print data, said printing means capable of being functionally connected to and functionally disconnected from said first network and receiving the print data while functionally connected to said first network;

external communication means for communicating with an external station through a second network;

internal communication means receiving operation related data from said printing means, the operation related data relating to an operation of said printing means;

said internal communication means further including:
  read-out means for reading the operation related data from said printing means; and
  storage means for storing the operation related data read-out by said read-out means;

means for determining whether a data request has been received from the external station within a predetermined time;
  second storage means for storing the operation related data which has not been transmitted to the external station within the predetermined time;
  control means for allowing said external communication means to communicate the operation related data to the external station;
  switch means for enabling selection of a priority status and for outputting a signal to said control means indicating whether a priority status has been switched on or off, wherein said control means allows said external communication means to communicate with the external station when the signal indicates that priority status has been switched on or, in the case that the signal indicates that the priority status has been switched off, only when said printing means is functionally disconnected from said first network.

20. A printer communication control apparatus for controlling communication between an external station and printing means connectable to a first network, comprising:

external communication means for communicating with the external station through a second network;

internal communication means for receiving operation related data relating to an operation of the printing means;

said internal communication means further including:
  read-out means for reading the operation related data from the printing means; and
  storage means for storing the operation related data read-out by said read-out means;

means for determining whether a data request has been received from the external station within a predetermined time;

second storage means for storing operation related data which has not been transmitted to the external station within the predetermined time;

control means for allowing said external communication means to communicate the stored operation related data to the external station via the second network only when the printing means is functionally disconnected from the first network.

21. The communication control apparatus of claim 20, further comprising:

sensing means for sensing whether the printing means is functionally connected to or disconnected from the first network, wherein said control means allows said external communication means to communicate with the external station only when said sensing means senses that the printing means is functionally disconnected from the first network.

22. The communication control apparatus of claim 20, wherein said control means is automatically activated to allow said external communication means to communicate with the external station when the printing means is functionally disconnected from the first network.

23. The communication control apparatus of claim 20, wherein said read-out means reads the operation related data and said storage means stores the operation related data read-out by said read-out means automatically at predetermined times.

24. The communication control apparatus of claim 20, wherein the printing means includes a printer, a plotter, or a copying machine having a printer option.

25. A printer communication control apparatus for controlling communication between an external station and printing means connectable to a first network, comprising:

external communication means for communicating with the external station through a second network;

internal communication means for receiving operation related data relating to an operation of the printing means;

sensing means for sensing whether the printing means is switched on or off; and control means for allowing said external communication means to communicate with the external station only when said sensing means senses that the printing means is switched off.

26. A printer communication control apparatus for controlling communication between an external station and printing means connectable to a first network, comprising:

external communication means for communicating with the external station through a second network;

internal communication means for receiving operation related data relating to an operation of the printing means; and control means for allowing said external communication means to communicate the operation related data to the external station only when the printing means is functionally disconnected from the first network, wherein said control means is automatically activated to allow said external communication means to communicate with the external station when the printing means is switched off.

27. A printer communication control apparatus for controlling communication between an external station and printing means connectable to a first network, comprising:

external communication means for communicating with the external station through a second network;

internal communication means for receiving operation related data relating to an operation of the printing means;

switch means for enabling selection of a priority status and for outputting a signal to said control means indicating whether a priority status has been switched on or off, control means for allowing said external communication means to communicate with the external station when the signal indicates that priority status has been switched on or, in the case that the signal indicates that the priority status has been switched off, only when the printing means is functionally disconnected from said first network and the signal indicates that the priority status has been switched off, wherein said control means is automatically activated to allow said external communication means to communicate with the external station when the printing means is switched off.

28. The communication control apparatus of claim 27, further comprising:

sensing means for sensing whether the printing means is functionally connected to or disconnected from the first network, wherein said control means allows said external communication means to communicate with the external station when the signal indicates that priority status has been switched on or, in the case that the signal indicates that the priority status has been switched off, only when said sensing means senses that the printing means is functionally disconnected from the first network.

29. The communication control apparatus of claim 27, wherein said control means is automatically activated to allow said external communication means to communicate with the external station when the printing means is functionally disconnected from the first network.

30. The communication control apparatus of claim 27, said internal communication means further including:

read-out means for reading the operation related data from the printing means; and storage means for storing the operation related data read-out by said read-out means, wherein said control means allows said external communication means to communicate with the external station when the signal indicates that priority status has been switched on or, in the case that the signal indicates that the priority status has been switched off, only when the printing means is functionally disconnected from the first network.

31. The communication control apparatus of claim 30, wherein said read-out means reads the operation related data and said storage means stores the operation related data read-out by said read-out means automatically at predetermined times.

32. The communication control apparatus of claim 30, further comprising means for determining whether a data request has been received from the external station within a predetermined time.

33. The communication control apparatus of claim 27, said switch means further including indicating means for indicating to the operator that external communication is allowed while the printing means is functionally connected to the first network.

34. The communication control apparatus of claim 27, wherein the printing means includes a printer, a plotter, or a copying machine having a printer option.

35. A printer communication control apparatus for controlling communication between an external station and printing means connectable to a first network, comprising:

external communication means for communicating with the external station through a second network;

internal communication means for receiving operation related data relating to an operation of the printing means;

switch means for enabling selection of a priority status and for outputting a signal to said control means indicating whether a priority status has been switched on or off;

sensing means for sensing whether the printing means is switched on or off; and control means for allowing said external communication means to communicate with the external station when the signal indicates that priority status has been switched on or, in the case that the signal indicates that the priority status has been switched off, only when said sensing means senses that the printing means is switched off.

36. A printer communication control apparatus for controlling communication between an external station and printing means connectable to a first network, comprising:

external communication means for communicating with the external station through a second network;

internal communication means for receiving operation related data relating to an operation of the printing means;

said internal communication means further including:
read-out means for reading the operation related data from the printing means, and storage means for storing the operation related data read-out by said read-out means;

switch means for enabling selection of a priority status and for outputting a signal to said control means indicating whether a priority status has been switched on or off, means for determining whether a data request has been received from the external station within a predetermined time;

second storage means for storing operation related data which has not been transmitted to the external station within the predetermined time control means for allowing said external communication means to communicate with the external station when the signal indicates that priority status has been switched on or, in the case that the signal indicates that the priority status has been switched off, only when the printing means is functionally disconnected from said first network and the signal indicates that the priority status has been switched off.

* * * * *